United States Patent
Blonder

(10) Patent No.: US 7,351,467 B2
(45) Date of Patent: Apr. 1, 2008

(54) BEVERAGE SAFETY LID

(76) Inventor: Greg E. Blonder, 129 Woodland Ave., Summit, NJ (US) 07901

( * ) Notice: Subject to any disclaimer, the term of this patent is extended or adjusted under 35 U.S.C. 154(b) by 221 days.

(21) Appl. No.: 10/924,058

(22) Filed: Aug. 23, 2004

(65) Prior Publication Data

US 2005/0053776 A1    Mar. 10, 2005

Related U.S. Application Data

(60) Continuation-in-part of application No. 10/353,248, filed on Jan. 28, 2003, now Pat. No. 6,966,812, which is a continuation-in-part of application No. 09/934,744, filed on Aug. 22, 2001, now abandoned, which is a continuation-in-part of application No. 10/378,510, filed on Mar. 3, 2003, now Pat. No. 7,112,362, which is a division of application No. 09/934,744, filed on Aug. 22, 2001, now abandoned, which is a division of application No. 09/442,229, filed on Nov. 17, 1999, now abandoned.

(51) Int. Cl.
*B32B 3/24* (2006.01)
*B65D 43/04* (2006.01)

(52) U.S. Cl. ............... 428/132; 220/201; 220/202; 220/203.16; 220/203.17; 220/714; 220/721

(58) Field of Classification Search ............... 428/132; 220/201, 202, 203.16, 203.17, 714, 721
See application file for complete search history.

(56) References Cited

U.S. PATENT DOCUMENTS

| | | | |
|---|---|---|---|
| 4,441,624 A * | 4/1984 | Sokolowski | 220/254.1 |
| 4,530,440 A | 7/1985 | Leong | |
| 4,999,470 A * | 3/1991 | Fuchs, Jr. | 219/689 |
| 5,042,677 A * | 8/1991 | Chen et al. | 220/201 |
| 5,176,275 A | 1/1993 | Bowie | |
| 5,503,583 A | 4/1996 | Hippely | |
| 5,518,433 A | 5/1996 | Sneddon | |
| 5,631,068 A | 5/1997 | Smith | |
| 5,720,555 A | 2/1998 | Elele | |
| 5,770,283 A | 6/1998 | Gosselin et al. | |
| 5,798,169 A | 8/1998 | Smith | |
| 5,834,093 A * | 11/1998 | Challis et al. | 428/136 |
| 6,047,878 A | 4/2000 | Lowrey | |
| 6,161,720 A | 12/2000 | Castle | |
| 2003/0127413 A1* | 7/2003 | Spinelli et al. | 215/11.4 |

* cited by examiner

*Primary Examiner*—William P Watkins, III
(74) *Attorney, Agent, or Firm*—Lowenstein Sandler PC

(57) ABSTRACT

In accordance with the invention, thin bodies of plastic, such as sheets or strands, with substantially different thermal coefficients of expansion, are laminated together to make plastic bodies that move in response to temperature change. The thermally movable plastic can be secured to a suitable base to make a variety of devices. In one embodiment, the thermally moveable plastic can be used in a beverage safety lid. The safety lid is particularly useful as a lid for hot drinks, such as hot coffee, soups and other foods.

7 Claims, 13 Drawing Sheets

9A

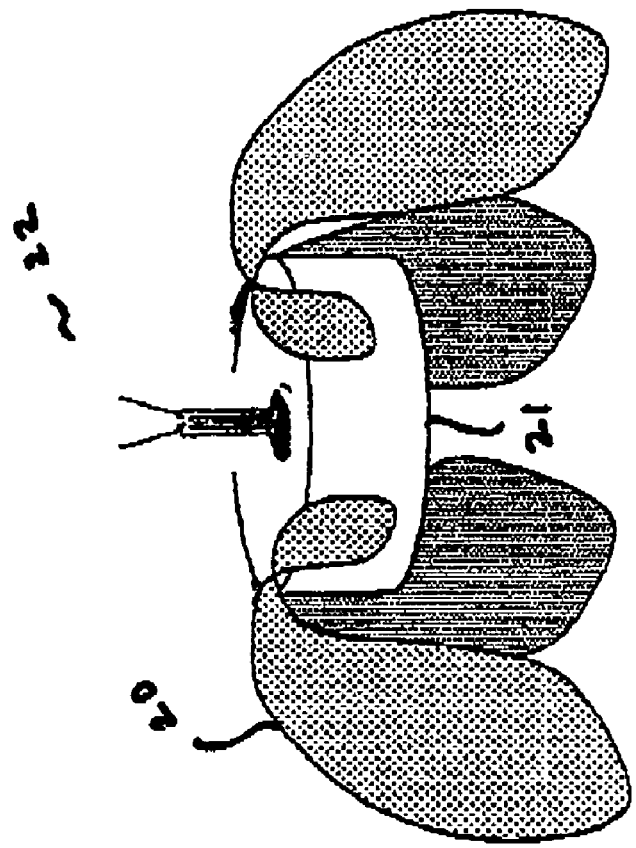
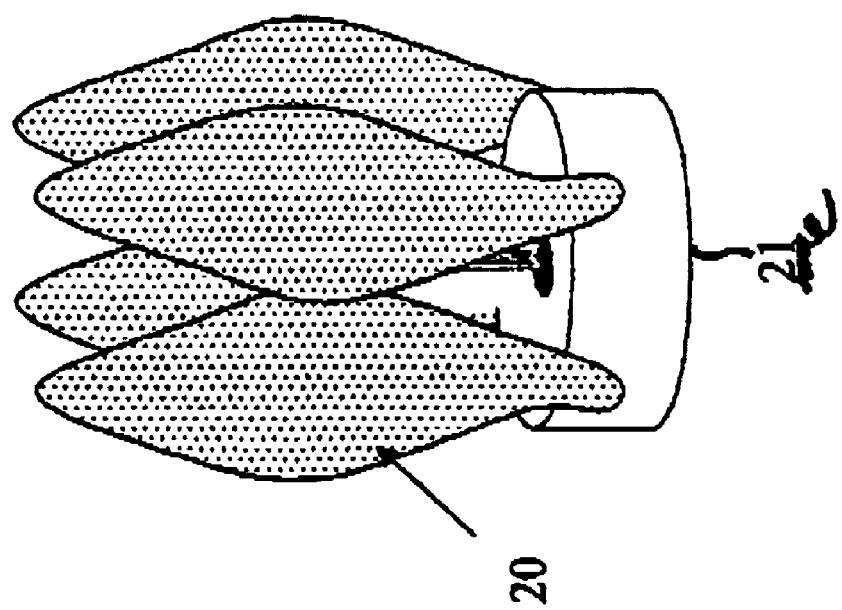
FIG. 2B (On)
FIG. 2A (Off)

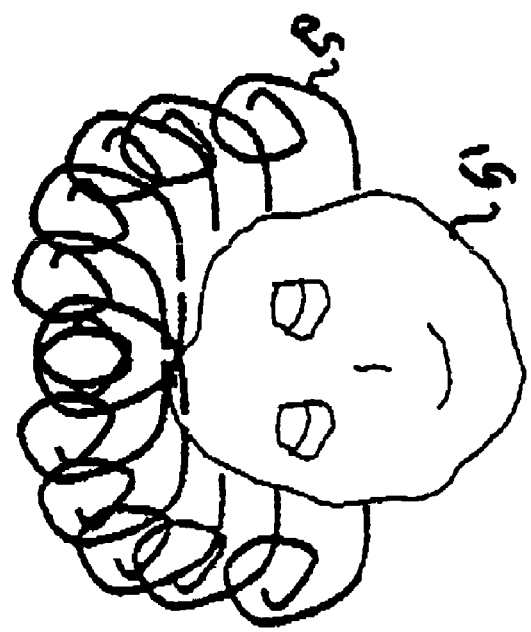
FIG. 5B (hot)
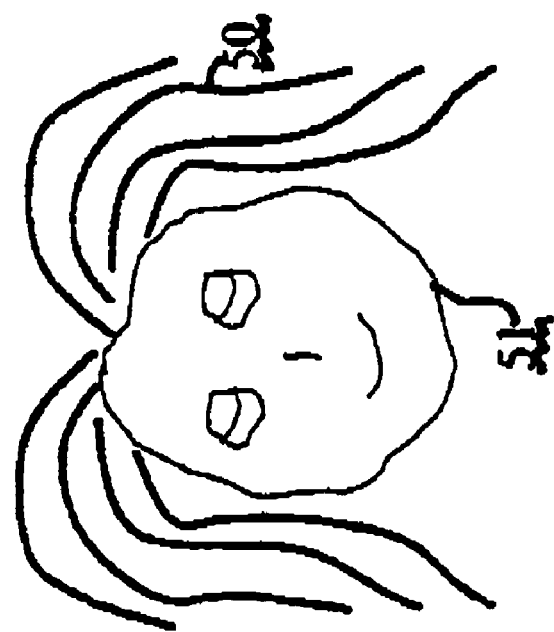
FIG. 5A (cold)

FIG. 9
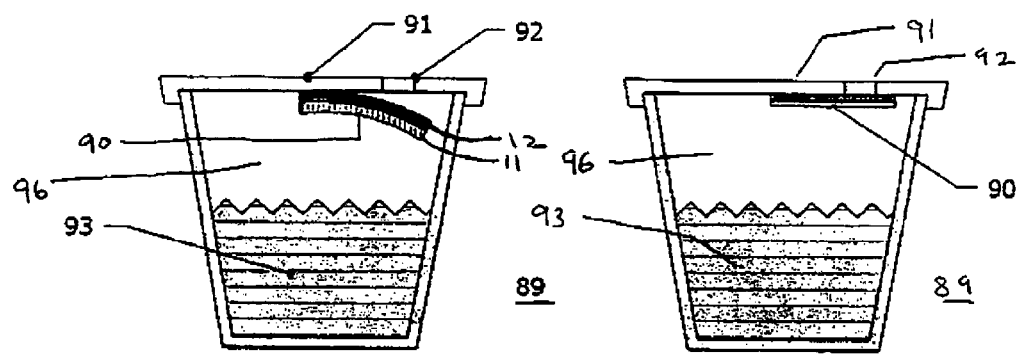
9A        9B
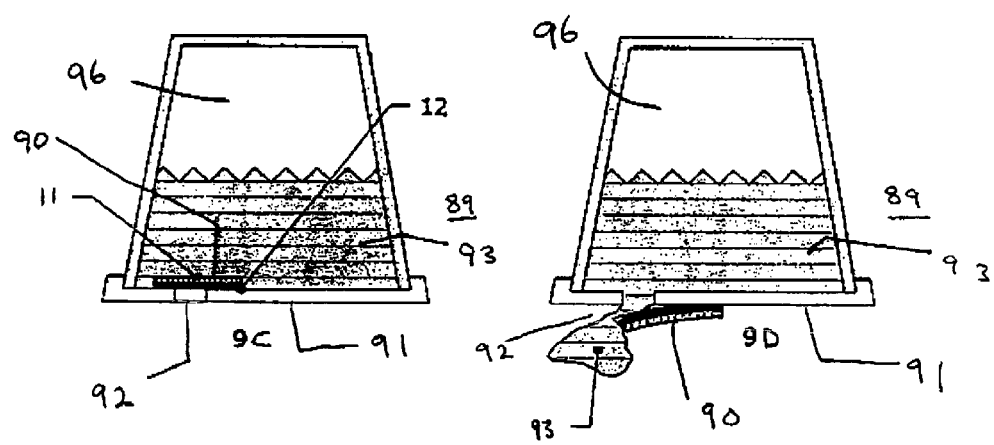
9C        9D

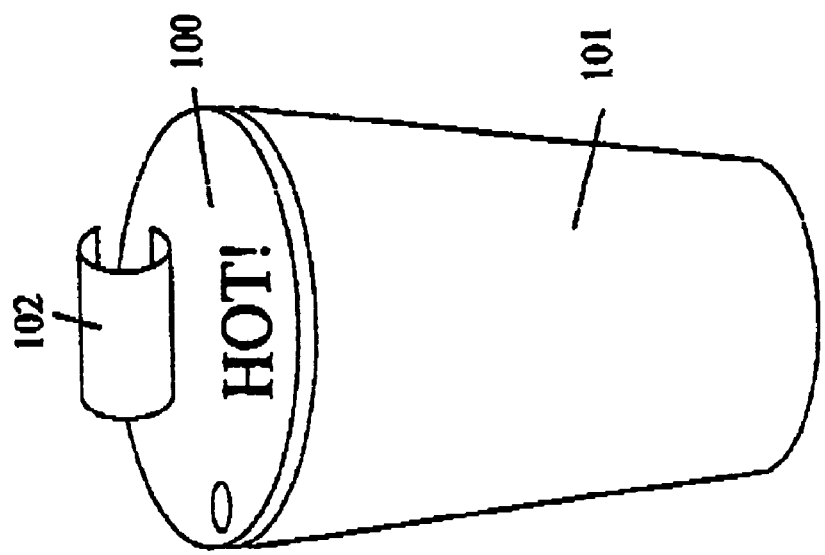
FIG. 10A (tepid)
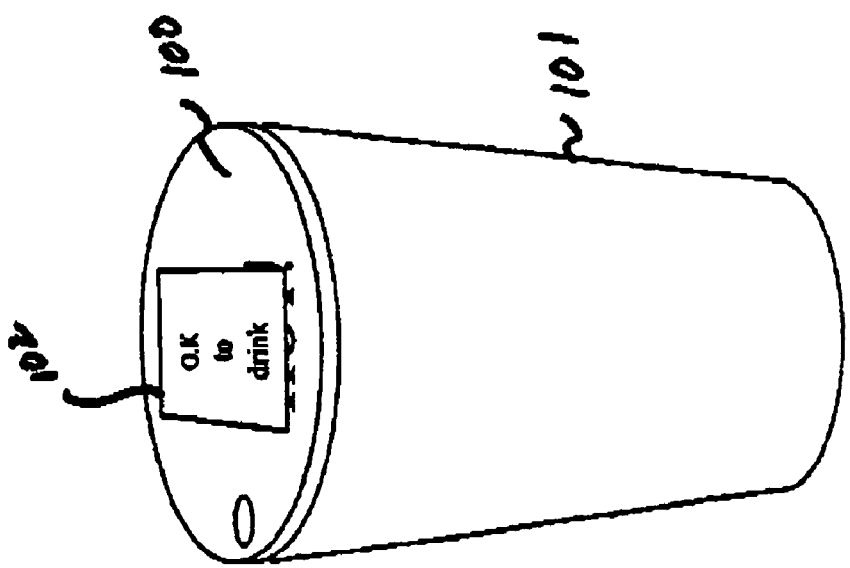
FIG. 10B (hot)

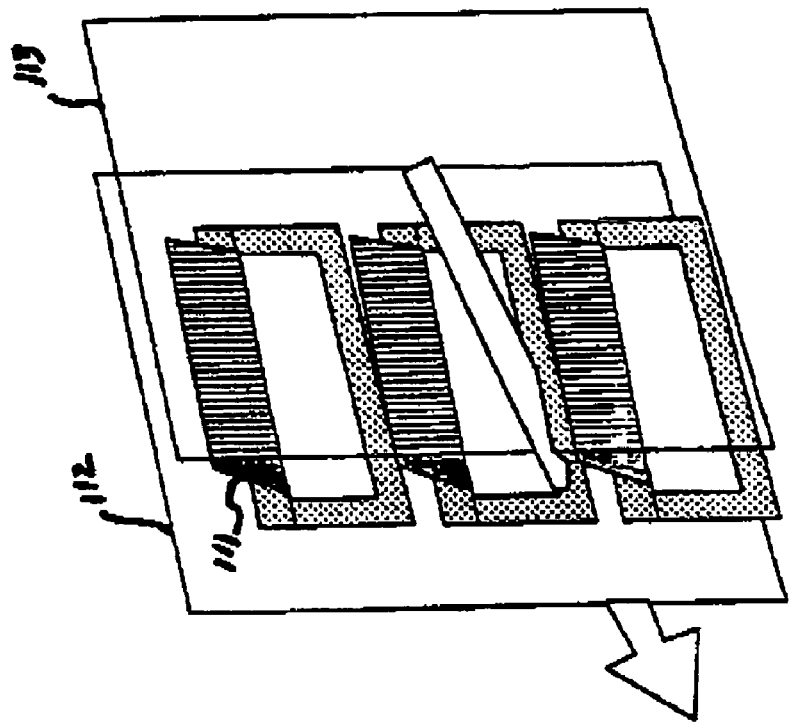
FIG. 11B (cold)
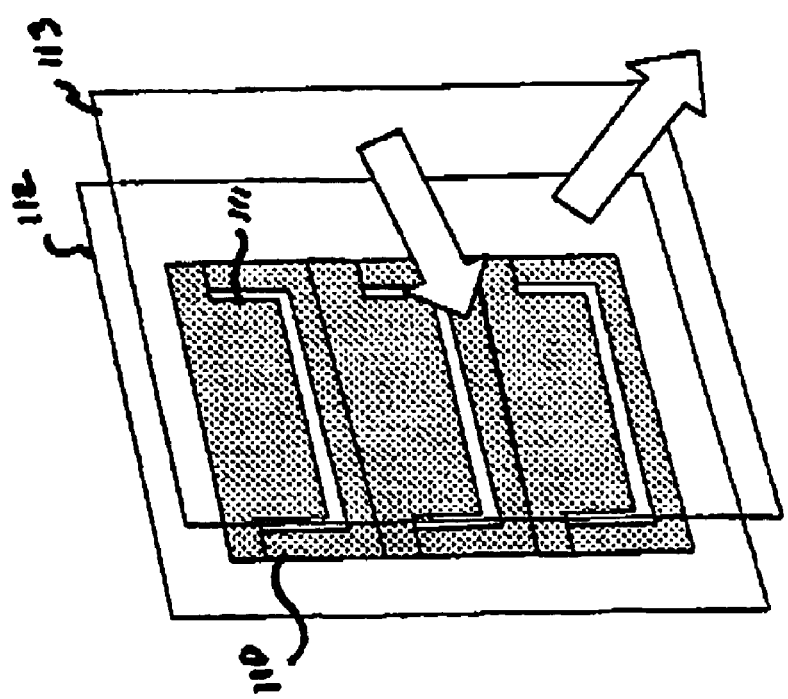
FIG. 11A (hot)

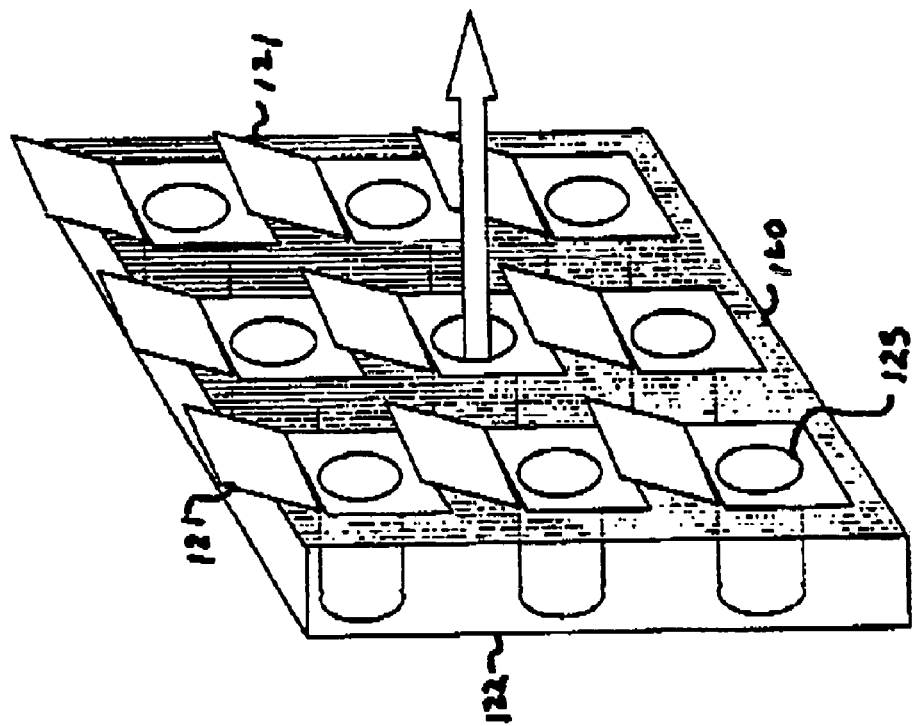
FIG. 12B (hot)
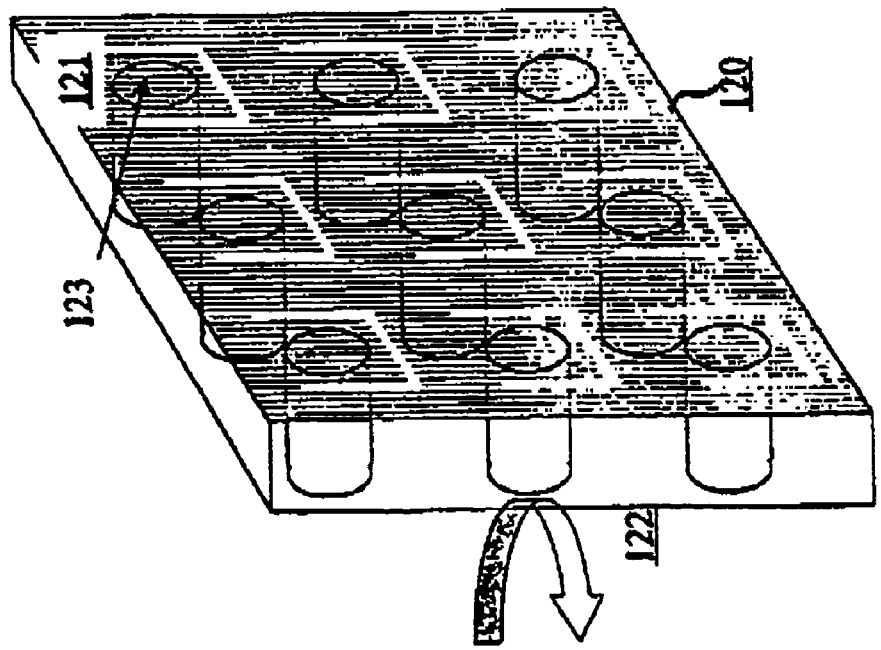
FIG. 12A (cold)

BEVERAGE SAFETY LID

This application is a continuation-in-part of application Ser. No. 10/353,248, by Greg E. Blonder, filed on Jan. 28, 2003, entitled "Thermally Movable Plastic Devices and Toys", now U.S. Pat. No. 6,966,812, which is a continuation-in-part of U.S. application Ser. No. 09/934,744, filed Aug. 22, 2001, now abandoned. This application is also a continuation-in-part of application Ser. No. 10/378,510, by Greg E. Blonder, filed on Mar. 3, 2003, also entitled "Thermally Movable Plastic Devices and Toys", now U.S. Pat. No. 7,112,362, which is a division of, and claims priority to, U.S. application Ser. No. 09/934,744, by Greg E. Blonder, filed Aug. 22, 2001, entitled "Thermally Movable Plastic Devices and Toys", now abandoned, which is a division of, and claims priority to, U.S. application Ser. No. 09/442,229, filed on Nov. 17, 1999, now abandoned. The entire disclosures of U.S. patent application Ser. Nos. 10/353,248 and 10/378,510 are hereby incorporated by reference herein.

FIELD OF THE INVENTION

This invention relates to plastic devices, and in particular, to plastic devices which move in response to heat.

BACKGROUND OF THE INVENTION

It is well known that if two thin strips of metal having different thermal coefficients of expansion are laminated together, they will bend and straighten in a manner dependent on the temperature. This movement is because changes in temperature cause one strip to lengthen more than the other. Since both strips are bonded together, the only way this length difference can be accommodated is by curling. The standard equation for the bending of a bimetallic strip is:

$$D = K(DT)(De)L^2/t \tag{Eq. 1}$$

where D is the distance the strip bends measured at the end of the strip, (DT) is the temperature difference relative to the temperature when the two layers were bonded, (De) is the thermal expansion difference, L is the length of the strip, t is the thickness, and K is a constant. Bimetallic strips are useful as thermometers and oven safety locks.

SUMMARY OF THE INVENTION

In accordance with the invention, thin bodies of plastic, such as sheets, fibers or strands, with substantially different thermal coefficients of expansion are laminated together to make thermally movable plastic, which moves in response to heat. The thermally movable plastic of the invention can be secured to a suitable base to make a variety of devices for amusement, temperature monitoring and display. Applications for amusement include a thermally blooming flower, a solar-energy activated butterfly, and curling hair for a doll. Applications for temperature monitoring include safety lids for drinking cups, sunlight blockers and ventilators.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIGS. 2-7 illustrate amusement devices comprising thermally movable plastic of the invention;

FIG. 9 illustrates a safety lid of the invention;

FIGS. 10-12 illustrate devices for temperature monitoring and control comprising thermally movable plastic of the invention.

It is to be understood that these drawings are for purposes of illustrating the concepts of the invention and are not to scale.

DETAILED DESCRIPTION

This disclosure is divided into four parts: Part I describes the thermally movable plastic of the invention; Part II describes thermally movable plastic devices for amusement; Part III describes such devices for temperature monitoring applications; and Part IV describes devices for display applications.

I. Thermally Movable Plastic of the Invention

Figure 1:
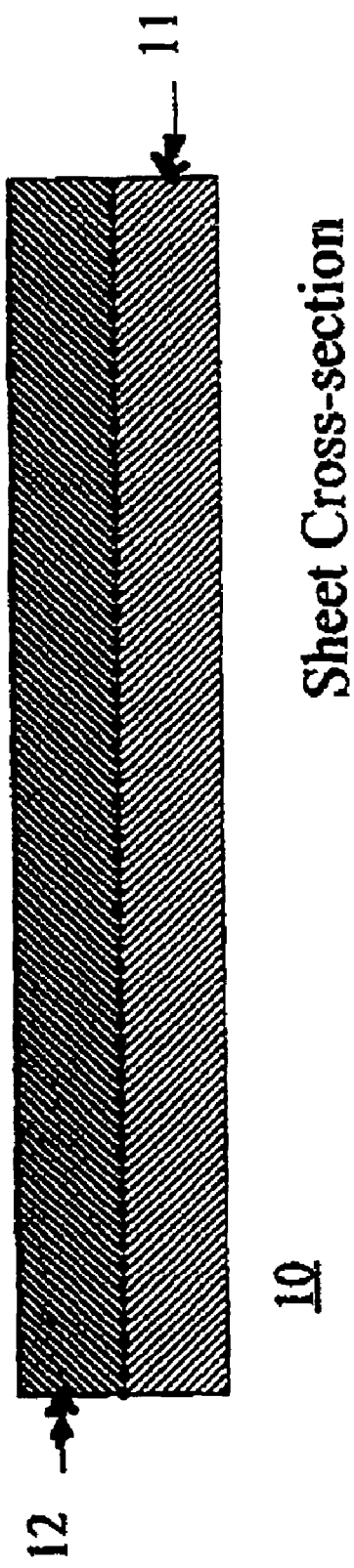
FIG. 1 is a schematic cross section of a thermally movable plastic body of the invention.

Referring to the drawings, FIG. 1 is a schematic cross section of thermally movable plastic of the invention 10. As used herein, the term "thermally movable plastic of the invention" means a body, sheet, strip, strand, or fiber 10 comprising two laminated portions 11 and 12 of plastic having respective coefficients of thermal expansion which differ by more than about $1 \times 10^{-5}$. Typical materials are polyethylene (thermal expansion coefficient about $8 \times 10^{-5}$/F) and polyvinyl chloride (PVC) (expansion coefficient about $3 \times 10^{-5}$/F). Typical thicknesses for each component layer vary from 1 to 10 mils.

The bending of thermally movable plastic body 10 follows the bimetallic strip bending equation (Eq. 1), so thinner layers and materials with a large difference in expansion coefficient show the greatest heat induced movement. Plastics typically have larger coefficients (by a factor of 10) than most metals, providing a higher level of thermal sensitivity. Moreover plastics are inexpensively available in a wide range of colors, including clear, permitting a wide range of aesthetic effects.

The curling direction of sheet 10 can be controlled in a number of ways. In general, the sheet will bend away from the layer with the greater expansion coefficient. Some plastics, such as polyethylene, exhibit biaxial expansion coefficients that differ in two directions. Biaxial expansion can result from stretching the plastic during manufacture, from inclusion of aligned, low-expansion fillers such as glass fibers, or from grooves or raised lines in the film in general, the sheet 10 will curl along the direction of higher expansion coefficient. Depending on the shape of the film relative to the curl direction, a spiral can result upon heating.

The amount of curling is generally linear with temperature. The displacement D doubles with a doubling in the temperature difference (DT). A non-linear displacement can be achieved by proshaping the sheet 10 into an arc perpendicular to the direction of thermal curl. When heated, the sheet tries to expand and curl, but first must overcome the spring forces created by the initial arc. Once the temperature rise creates enough force, the sheet snaps open into a strong curl. Such pre-shaped sheets are useful, for example, in controlling valves to be open or closed at a particular temperature. Alternatively, nonlinear curling can be obtained by attaching a weight or small magnet to one end of the sheet. The sheet will not move until enough force is generated to overcome the weight or magnet.

Sheet 10 can be fabricated by any of a number of conventional laminating techniques. For example layers 11 and 12 can be bonded with a pressure sensitive adhesive such as a two-part epoxy. This has the advantage of room temperature fabrication. For example, PVC tape can be bonded to polyethylene sheets. Alternatively, the sheets can be attached together with heat or light sensitive adhesives.

The sheets 11 and 12 need not be chemically different polymers. Polyethylene, for example, exhibits a factor-of-five difference in expansion coefficient between low and high molecular weight versions. Thus sheet 10 could comprise low and high molecular weight polyethylene. It is even possible to dispense with lamination by spraying a crosslinking agent on only one surface of a low or middleweight sheet, relying on the reaction of the agent through only a portion of the thickness to increase molecular weight on only one side and thus produce a the thermally movable plastic of the invention.

The thermally movable plastic of the invention can be formed into sheets, thin strips, fibers or strands. Thermally movable plastic strips can be made by forming sheets and cutting them into narrow strips. Thermally movable plastic strands or fibers can be made by co-injecting the two kinds of plastic through one nozzle, thereby ejecting a thermally movable strand or fiber bilayer.

The thermally movable plastic sheets, strips, fibers and strands of the invention can be used in a wide variety of applications. In general, the thermally movable plastic is secured to a relatively rigid base, and the effect and application of the thermally movable plastic depends upon the nature of the base.

II. Toy Applications

A. Blooming Flower

FIGS. 2A and 2D illustrate a device for amusement comprising a plurality of elongated oval (leaf shaped) of thermally movable plastic bodies 20 secured around a common base 21 around a heat source 22 such as a low wattage light bulb. The pieces 20 can have one color on the underside, e.g. green, and another color on the top, e.g. red. The pieces 20 can comprise 2 mil polyethylene laminated to 2 mil PVC and the heat source can be a 7 watt bulb.

In use, the device behaves as a blooming flower. The pieces 20 can be oriented and arranged so that when the power of OFF, the pieces 20 curl around source 22, shielding it from view. This is illustrated in FIG. 2A. When the power is ON, heat from the source 22 causes the pieces 20 to curl away from the source, and the flower appears to bloom. This is depicted in FIG. 23. The side of the leaf facing the source is preferably dark to absorb as much heat as possible.

B. Butterfly

Figure 3B:
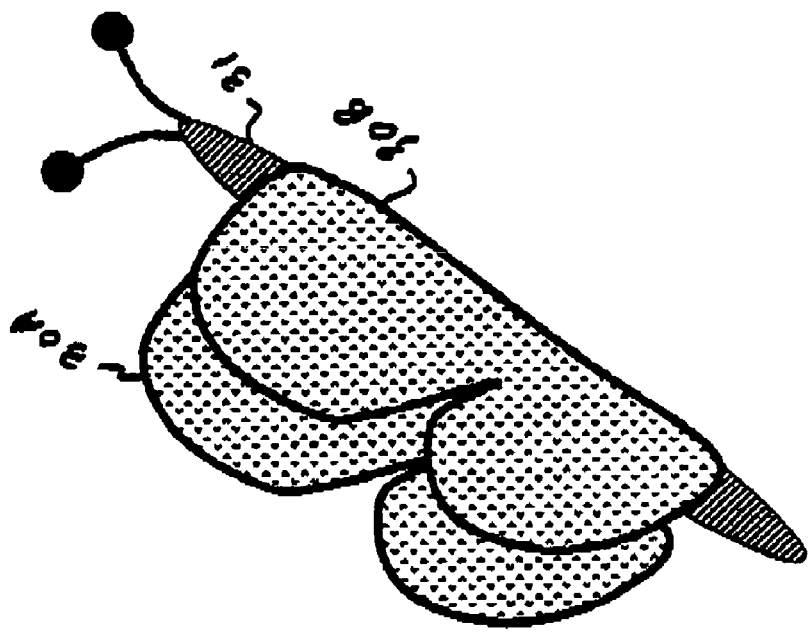
Figure 3A:
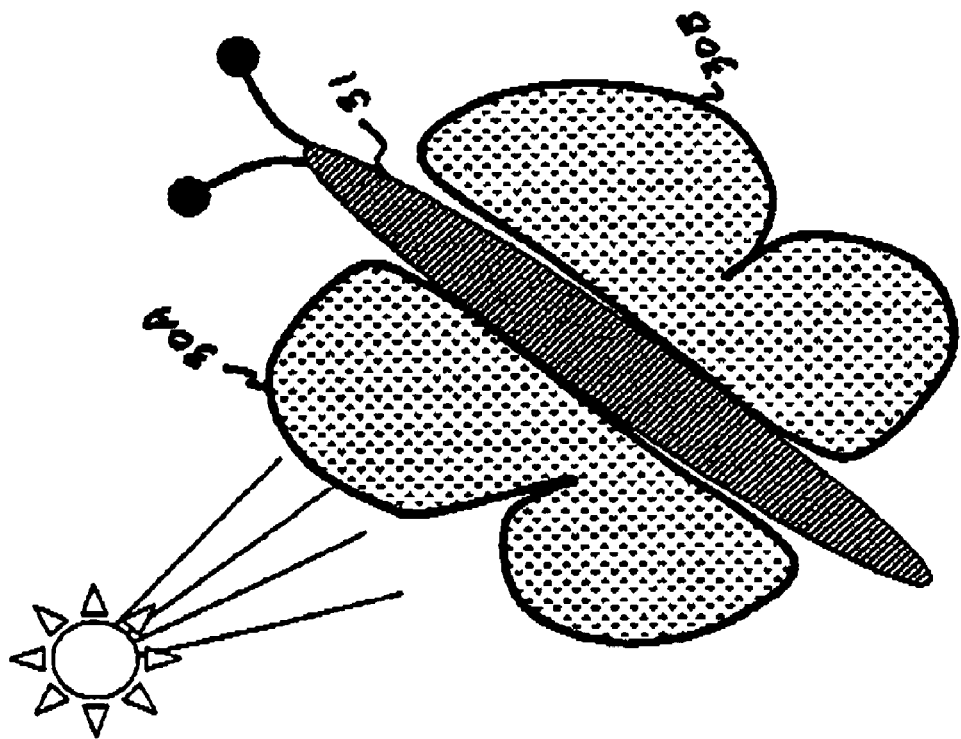

FIGS. 3A and 3B depict a device to simulate a flying creature comprising a pair of generally oval thermally movable plastic bodies 30A and 30B secured on opposite sides of a generally cylindrical base 31. Advantageously 30A and 30B, in the flat condition, are sandwiched together, concealing the top surface. This is shown in FIG. 3B. In the curled condition shown in FIG. 3A, the wings open and the top surfaces are revealed. The pieces 30A and 30B can be imprinted on the top with a colorful pattern, such as that of a Monarch butterfly, and the body 31 can present a fuzzy texture such as that of a pipe cleaner.

In use, the device behaves as a butterfly. The pieces 30A and 30B can be oriented and arranged so that sunlight striking them causes them to open up like the wings of a butterfly. Animation can be achieved by providing a variable source of heat (not shown) such as an electrically powered heat source that cycles ON and OFF.

C. Opening Pyramid

Figure 4B:
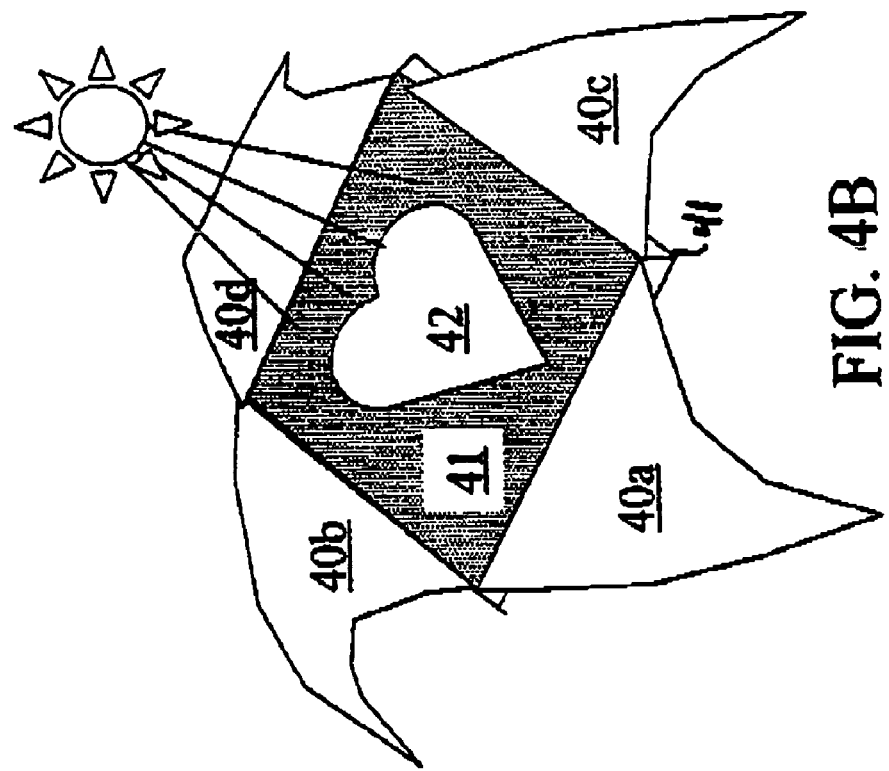
Figure 4A:
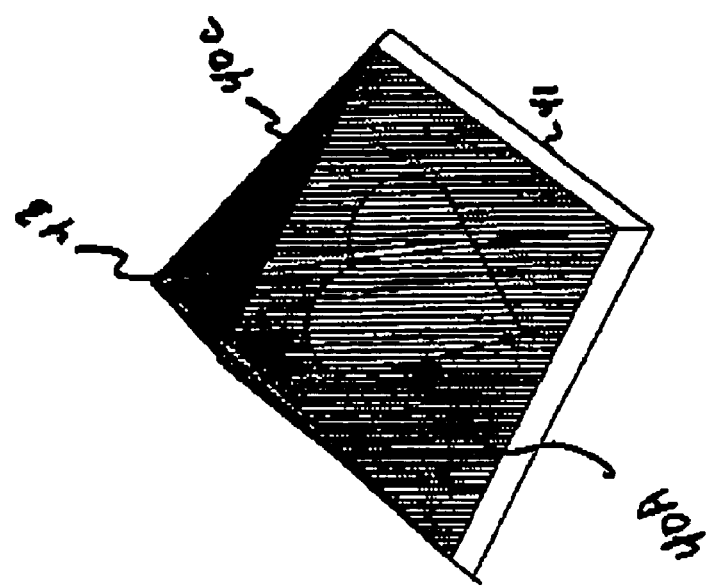

FIGS. 4A and 4B show a device comprising a plurality of triangular-shaped thermally movable plastic bodies (40A-40D) with respective sides secured to sides of a polygonal base 41. The base 41 can include a display object 42. In the flat condition shown in FIG. 4A, the pieces 4DA-40D can come together in a common apex 43 to form a closed pyramid, concealing the display object 42. In the curled condition (FIG. 4B), the pieces open up, revealing the object 42. Optional struts (not shown) could be provided to assist alignment of the flat condition pieces. Suitable display objects could include imitation Egyptian artifacts or attractive minerals (not is shown).

D. Curling Doll Hair

FIGS. 5A and 5B illustrate a device comprising a plurality of thermally movable plastic strips or strands of the invention 50 secured to an area on a generally ellipsoidal (head shaped) base 51. In the flat condition (FIG. 5A), the thin strips behave as flexible strands. In the curled condition (FIG. 5B), the strips or strands 50 behave as curled strands.

In use as doll hair, the strips or strands 50 can be oriented so that they will normally be curled. However, if placed under running cold water, the strands will straighten for grooming and styling. Upon drying they will revert to their curled state.

Strips can be made by cutting thermally movable plastic of the invention. Alternatively thermally movable plastic strands of the invention can be made by co-injecting two kinds of plastic through one nozzle, thus ejecting a bi-layer thermally movable plastic fiber of the invention.

E. Solar Motor

Figure 6B:
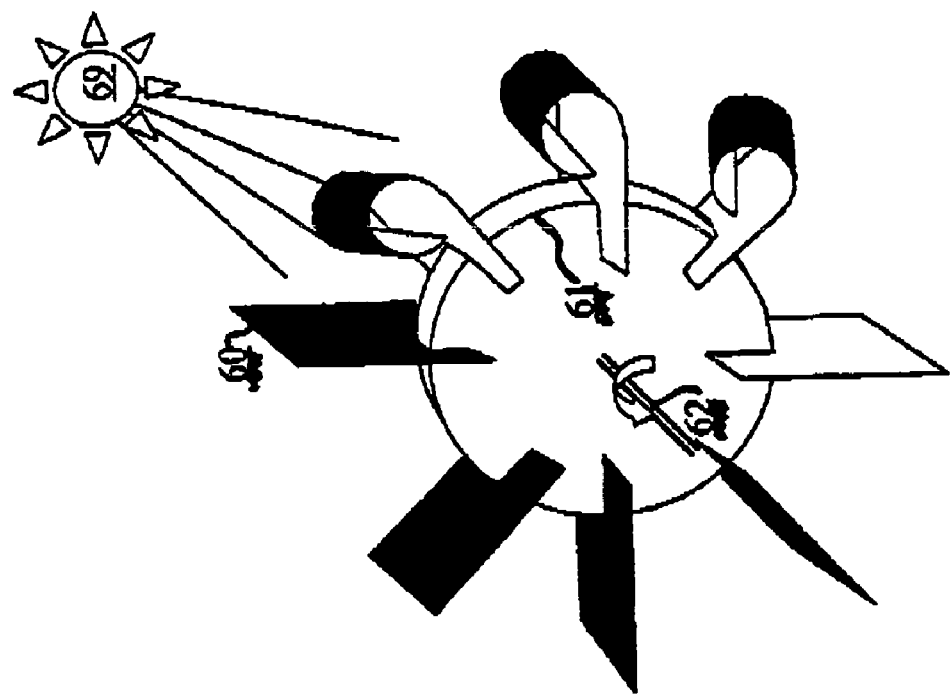
Figure 6A:
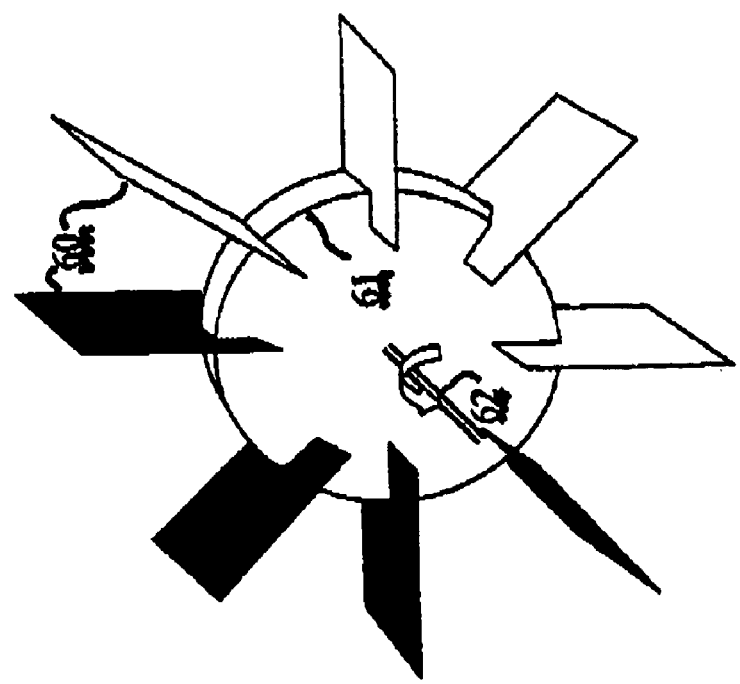

FIGS. 6A and 6B show a device comprising a plurality of thermally movably strips of the invention 60 secured around the circumference of a circular ring or cylinder 61. The ring 61 is advantageously clear plastic and can be mounted to freely rotate on a central axle 62. In the flat condition, the strips 60 extend radially outward from the ring. In the curled condition (FIG. 6B), the strips bend radially inward.

In operation, the devices behaves as a solar motor When sunlight 69 strikes the ring, the exposed strips 60 bend, shifting the center of mass of the ring 61. The ring then rotates to bring the new center of mass under the axle 62. This movement, in turn exposes a different set of strips to the sunlight. The cycle repeats, causing the ring to rotate continuously.

F. Artificial Plant Stems

Figure 7B:
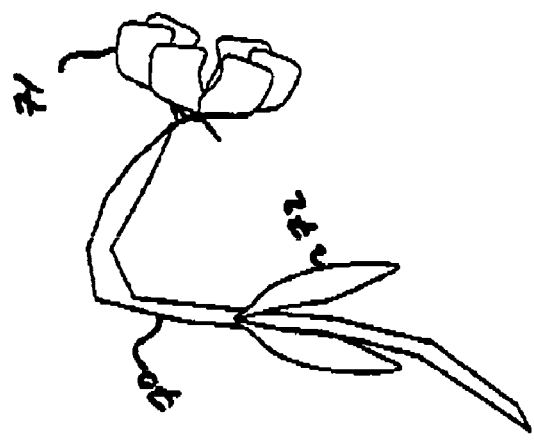
Figure 7A:
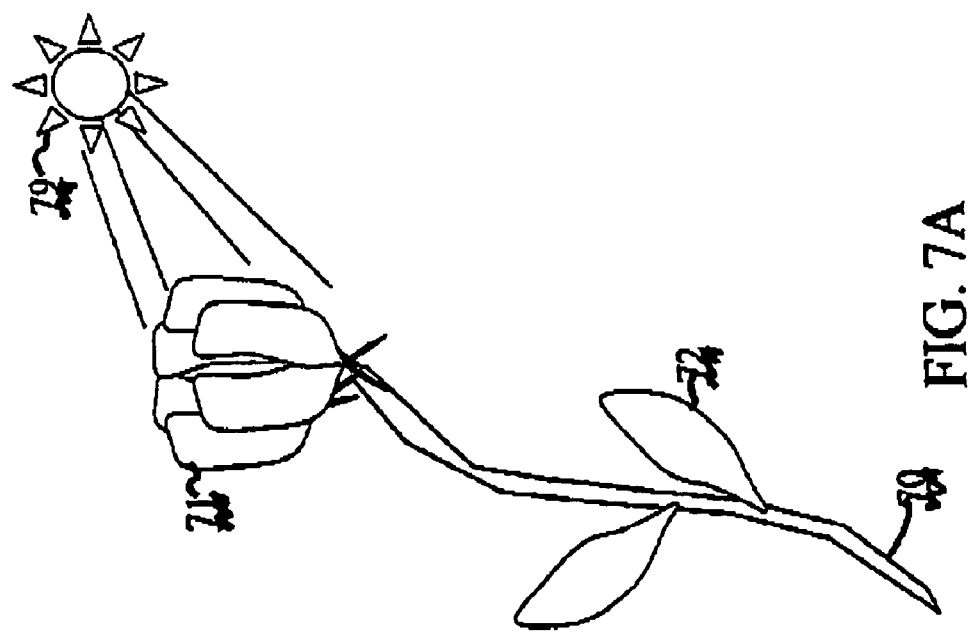

FIGS. 7A and 7B depict a device comprising thermally movable plastic of the invention in the form of a thick strip or strand 70 having artificial flowers 71 and/or artificial leaves 72 secured to it. The strip or strand 70 is advantageously colored green and shaped to appear as an artificial plant stem. Advantageously, the artificial flowers and artificial leaves can also be made of thermally movable plastic of the invention.

In operation, the stem 70 behaves as a phototropic plant, moving from one position (FIG. 7A) to another (FIG. 7B) in response to sunlight. It can be oriented to follow the sun. The flowers 71 can bloom in the sun, and the leaves 72 can curl in the absence of light.

III. Temperature Monitoring Applications

A. Thermometer

Figure 8:
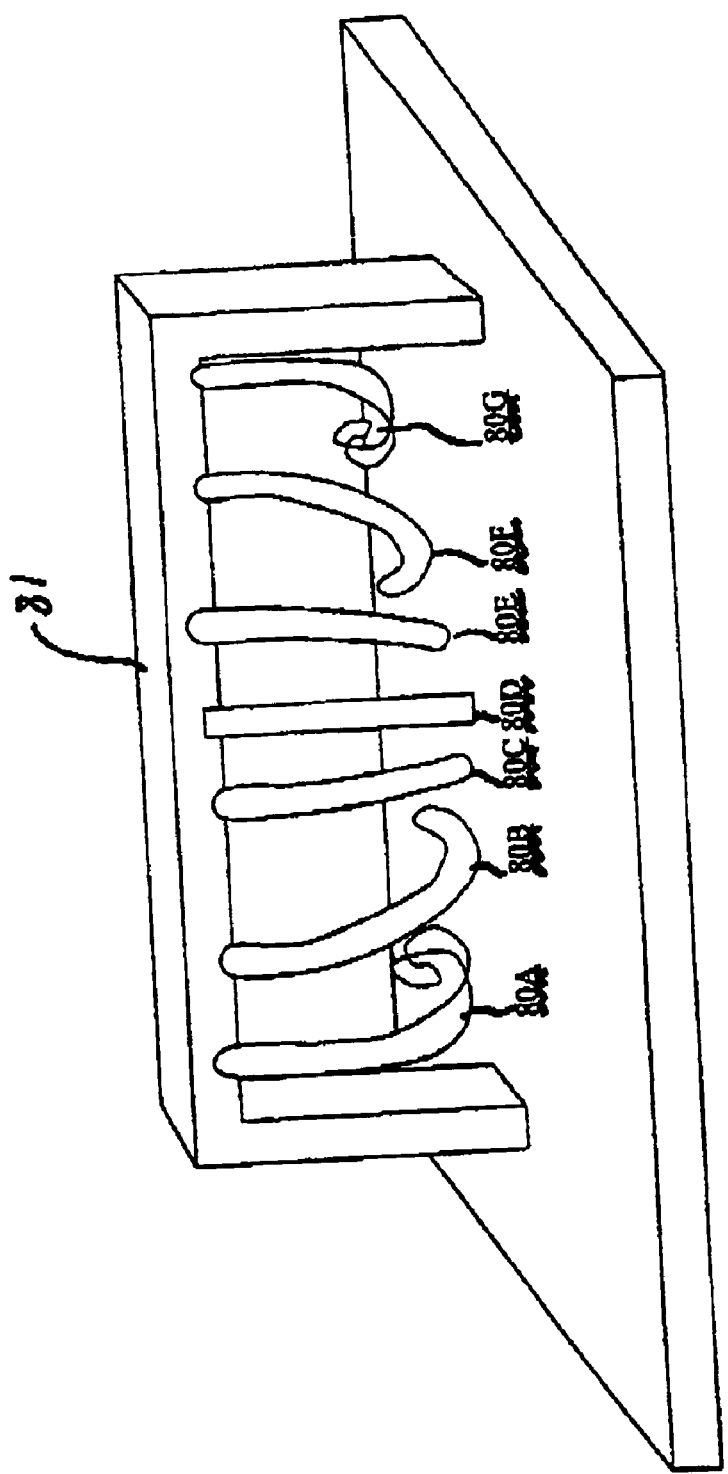
FIG. 8 illustrates a thermometer of the invention comprising one or more of strips of thermally movable plastic of the invention.

FIG. 8 illustrates a thermometer comprising one or more of strips 80A-80G of thermally movable plastic of the invention suspended from a linear base 81 to hang in a parallel array. The strips are fabricated to curl at respectively different temperatures, e.g. temperatures spaced apart by about 5 degrees Fahrenheit. The strips are advantageously reflective (white or silver) to assure temperature readings are not by absorbed sunlight, and conveniently they are marked (not shown) with the temperature they indicate. Slightly conducting plastics are advantageous for minimizing the effect of static charges. In operation, the temperature can be indicated by the strip hanging vertically, with the remaining strips curled Any number of strips can be used. A single strip can be used as an indicator of normal room temperature.

B. Drinking Lid That Protects Against Escape of Hot Beverages or Foods ("Safety Lid")

FIGS. 9A-9D depict one embodiment of a beverage safety lid of the invention, 91, for use with container 89, comprising cavity 96 and holding substance 93, such a liquid beverage or food. FIG. 9A depicts beverage safety lid 91 in an open position for drinking or eating when substance 93 is at an appropriate, pre-selected temperature. FIG. 9B depicts lid 91 in a closed position to prevent substance 93 that is at a second temperature, pre-selected as inappropriate for substance 93 to exit, for example, a temperature where the substance is too hot to ingest. The safety lid of the invention is particularly useful as a lid for hot drinks, such as hot coffee, soups and other foods.

Lid 91 includes flap 90, which comprises the thermally movable plastic of the invention shown in FIG. 1. Referring to FIG. 9A, with reference to FIG. 1, flap 90 comprises bottom laminate layer 11 (which is positioned adjacent to substance 93 when flap 90 is in the closed position shown in FIG. 9B) and top laminate layer 12 (which is positioned adjacent to the external environment in the closed position shown in FIG. 9B). Advantageously, flap 90 is attached to lid 91 from the underside, such that flap 90 is below the plane of lid 91. Accordingly, in lid 91's open position, depicted in FIG. 9A, flap 90 is directed into cavity 96 of container 89. Furthermore, flap 90's cross-sectional surface area is greater than the cross sectional surface area of lid opening 92. Accordingly, when flap 90 is in the closed position, depicted in FIG. 9B, it seals lid 91 from the underside. In this construction, if container 89 is tipped over when lid 91 is in the closed position (as shown in FIG. 9C), the pressure of substance 93, itself, against flap 90 further reinforces the seal to protect the user against hot-substance escape.

This is in contrast to the construction shown in FIG. 9D, which illustrates a lid of the invention comprising flap 90 in a top-side construction. In such a top-side construction, flap 90 is less resistant to pressure from substance 93 when container 89 is knocked over, as illustrated by FIG. 9D. Although it lacks the fortification of the construction shown in FIGS. 9A-9C, FIG. 9D's top side construction is useful to prevent splashing of hot liquid if container 89 is jarred. Furthermore, one of skill in the art can fortify flap 90, for example, by proper selection of component plastics 11 and 12 and adjustment of the thickness to prevent exit of hot substance 93 if container 89 having a top-side construction, exemplified by FIG. 9D, is knocked over.

A further advantage of directing flap 90 into container 89 is that flap 90 is in close proximity to and/or contacts substance 93. Thus, flap 90 reacts directly to substance 93's temperature.

In operation, if container 89 is filled with a substance at a temperature too high for drinking or eating, such as hot coffee at a temperature of 98° C., flap 90 remains closed as shown in FIG. 9B and prevents the user from inadvertently drinking or eating a scalding beverage or food substance.

When substance 93's temperature is suitable, for example 85° C., flap 90 curls away from lid opening 92 permitting the user to ingest substance 93. The user can also look to see whether flap 90 is open or closed as an indicator of when he or she can drink or eat substance 93. Furthermore, flap 90 can be colored to more conspicuously indicate to the user whether the flap is open or closed.

The identity and thickness of flap 90's component plastics (i.e., the two laminated portions of flap 90 corresponding to 11 and 12 of FIG. 1) are pre-selected and oriented so that flap 90 moves upward to seal lid opening 92 when substance 93 reaches a particular pre-selected temperature. For example, the component plastic layers 11 and 12 (see FIG. 1) of flap 90 can be chosen such that flap 90 moves to seal lid opening 92 if it contacts a substance having a temperature of from about 40° C. to about 101° C., preferably, of from about 45° C. to about 100° C., more preferably, of from about 50° C. to about 80° C. Preferably, the thickness of flap 90 ranges of from about 0.05 mm to about 1 mm, more preferably, of from about 0.1 mm to about 0.5 mm.

Preferably, the two laminated plastic layers 11 and 12 (see FIG. 1) of flap 90 have respective coefficients of thermal expansion which differ by more than about $1 \times 10^{-5}$, preferably, by more than $2 \times 10^{-5}$. Preferably, top layer 12 is constructed of styrene having a coefficient of thermal expansion of $5 \times 10^{-5}$ and a thickness of 3 mils (0.075 mm). Preferably, the bottom layer 11 is constructed of nylon having a coefficient of thermal expansion of $8 \times 10^{-5}$ and a thickness of 3 mils (0.075 mm). Other combinations, using materials such as polyethylene, mylar, ABS or polyimide, are also effective as laminates for flap 90.

C. Heat Indicator for Drinking Cup

FIGS. 10A and 10B show a lid 100 for a drinking cup 101 including a warning flag 102 of thermally movable plastic secured on top of the lid. The top of the flag 102 can be white indicating the contents and can be drunk and the bottom or underlying lid can be red with a warning message, e.g. "Too Hot". When the contents of the container are cool enough to drink, the flag lies flat (FIG. 10A). When it is too hot, the flag curls up, exposing the warning message (FIG. 10B).

D. Radiant-Energy-Transmission Control Devices

In another embodiment, the invention comprises devices and methods that control the transmission of radiant energy, such as visible light, infrared rays, ultraviolet rays, X rays, and gamma rays. Such methods and devices are useful to control temperature in areas reachable or accessible by radiant energy. In one aspect of this embodiment, the radiant-energy control devices and methods block some or all radiant-energy transmission to lower the temperature of an area or allow all or a portion of radiant energy to pass to raise the temperature of an area.

Radiant-energy-transmission control devices of the invention comprise a thermally moveable plastic body, as defined above, in communication with an obstructed, radiant-energy-transparent opening. In another embodiment, the radiant-energy-transmission control devices of the invention comprise a member of thermally movable plastic of the invention in communication with a completely unobstructed opening. As used herein, obstructed means that the opening is partially or fully closed by a material. Radiant-energy-transparent means that at least a portion of radiant energy can pass through the opening. Examples of obstructed, radiant-energy-transparent openings include, but are not limited to, openings obstructed by glass; a translucent polymeric material, such as clear plastic; natural or synthetic fabric, such as mosquito netting; a mesh, such as wire or fiberglass mesh; paper, gratings; bars, such as metal bars;

and screens, such as the aluminum or fiberglass screens used for home windows. Specific examples of obstructed, radiant-energy-transparent openings include home-window glass or plastic panes, home-window screens, and car-window glass, the lid on a thermally insulated picnic basket, the wall beneath a skylight, and a roof eave's vent. If desired, the thermally movable plastic member is coated with a reflective material to preclude raising the member's temperature by the action of radiant energy. In one example of operation, the reflective, thermally movable plastic member is in communication with an opening in an enclosed area, such as a room accessible by visible light, such as sunlight. When the temperature in the room rises, the thermally movable plastic member moves to partially or fully reflect the transmission of sunlight into the room, thereby lessening the sun's ability to heat the room. On the other hand, if the room's temperature falls below a certain value, the thermally movable plastic member moves to allow more light transmission into the room and thereby increase the sun's ability to heat the room.

FIGS. 11A and 11B shows a variable sunlight blocker comprising a sheet 110 of thermally movable plastic in the form of louvers 111 adhered to a plane of radiant-energy transparent material 112 comprising the window of a house. Preferably, the sheet is placed in the center of a thermoplane window formed with a second glass plane 113. At low temperatures or low sunlight conditions (FIG. 11B), the louvers 111 move to allow sunlight transmission through transparent material 112 and into the house. At higher temperatures (FIG. 11A), the louvers 111 move to fully or partially block the light transmission through transparent material 112, reducing the heat load on the house.

E. Variable Ventilator

FIGS. 12A and 12B illustrate a variable ventilator comprising a sheet 120 of thermally movable plastic cut to define an array of flags 121. The sheet is bonded onto an apertured support sheet 122, such as perforated masonite or flexible plastic, having holes 123 that line up under each flap. Each flap/hole combination forms a valve that lets air pass through at some temperatures and blocks air flow at other temperatures (FIG. 12A). The ventilator could be designed to move based on responding to the ambient temperature, or, for example in the case of a greenhouse, to the amount of incident sunlight as in section D above.

Such variable ventilators can be used to let air out of an attic in summer but seal it in winter. They can assist temperature regulation in greenhouses and coldframes. And, produced as large areas of clear plastic, they can assist in temperature regulation of entire gardens or even fields. The flaps would let in rain yet still moderate temperature.

IV. Display Applications

These devices also provide novel and attractive visual displays. For example, the opening pyramid of FIG. 4 can be used as a product display.

Figure 13B:
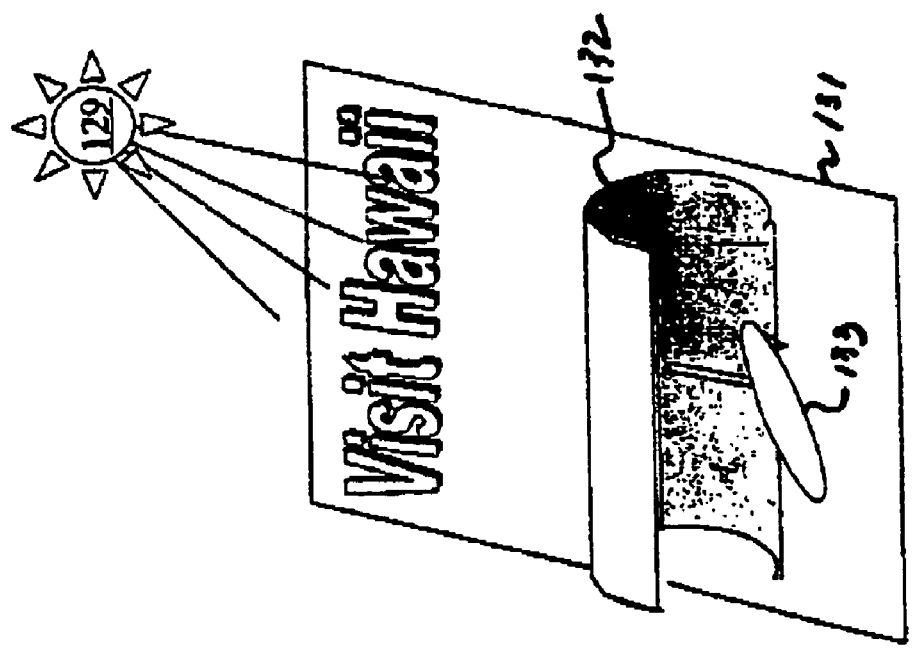
FIG. 13 shows a device useful as an advertising display comprising a thermally movable plastic of the invention.
Figure 13A:
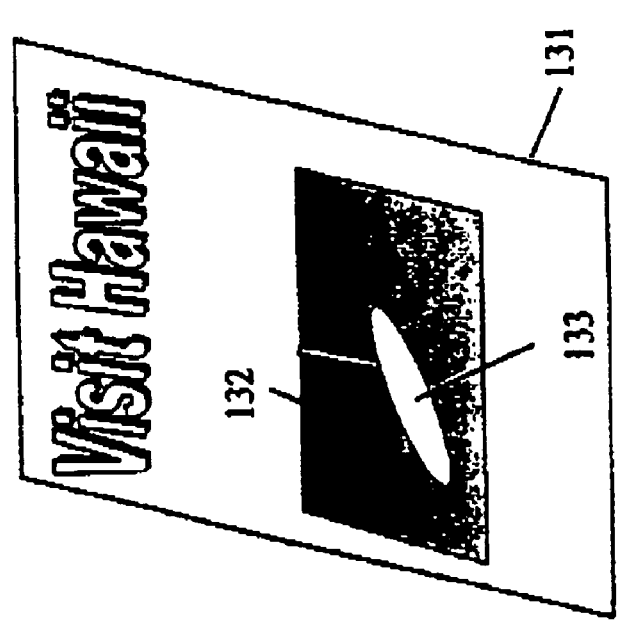

FIGS. 13A and 13B illustrate another display wherein a thermally removable plastic sheet 132 is partially attached to a display board 131 so that upon heating by a heat source 129 it will produce a three-dimensional effect. In the example shown, upon heating the sheet 132 curls like a wave. Light objects such as a simulated surfboard 133 can also be attached to the sheet 132 to enhance the three-dimensional affect.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. A safety lid adapted to attach to a container, the container comprising a cavity for containing a substance, the lid comprising a flap in communication with an opening, the flap comprising at least two polymeric components having coefficients of thermal expansion that differ by more than $1 \times 10^{-5}$, wherein when the lid is attached to the container, the flap is below a plane of the lid, and wherein when the substance is at a first pre-selected temperature, the flap substantially covers the opening and when the substance is at a second pre-selected temperature, the flap moves away from the opening into the cavity, the second pre-selected temperature being lower than the first pre-selected temperature.

2. The lid of claim 1, wherein a cross-sectional surface area of the flap is greater than a cross-sectional surface area of the opening.

3. The lid of claim 1, wherein the flap moves upon contact with the substance.

4. The lid of claim 3, wherein the flap moves upon contact with the substance when the substance is within a pre-selected temperature range.

5. The lid of claim 1, wherein at the first pre-selected temperature, the flap contacts a portion of a periphery of the opening to hinder the substance from exiting the container.

6. The lid of claim 4, wherein the pre-selected temperature range is from about 50° C. to about 101° C.

7. The lid of claim 4, wherein the pre-selected temperature range is from about 50° C. to about 80° C.

* * * * *